US012628069B2

(12) United States Patent
Zou

(10) Patent No.: US 12,628,069 B2
(45) Date of Patent: May 12, 2026

(54) NETWORKING METHOD, DEVICE AND EQUIPMENT FOR LARGE-SCALE WIRELESS EQUIPMENT AND STORAGE MEDIUM

(71) Applicants: Self Electronics Co., Ltd., Ningbo (CN); Wanjiong Lin, Ningbo (CN); Self Electronics USA Corporation, Norcross, GA (US)

(72) Inventor: Huimin Zou, Ningbo (CN)

(73) Assignees: Self Electronics Co., Ltd., Ningbo City (CN); Wanjiong Lin, Ningbo City (CN); Self Electronics USA Corporation, Norcross, GA (US)

( * ) Notice: Subject to any disclaimer, the term of this patent is extended or adjusted under 35 U.S.C. 154(b) by 296 days.

(21) Appl. No.: 18/396,119

(22) Filed: Dec. 26, 2023

(65) Prior Publication Data

US 2024/0224162 A1     Jul. 4, 2024

(30) Foreign Application Priority Data

Dec. 29, 2022    (CN) .......................... 202211710028.5

(51) Int. Cl.
*H04W 48/10*      (2009.01)
*H04W 72/30*      (2023.01)

(52) U.S. Cl.
CPC ........... *H04W 48/10* (2013.01); *H04W 72/30* (2023.01)

(58) Field of Classification Search
CPC ....... H04W 48/10; H04W 72/30; H04W 4/06; H04W 4/50; H04W 4/70; H04W 4/80; H04W 48/16; H04W 24/04; H04L 67/12; Y02D 30/70
See application file for complete search history.

(56) References Cited

U.S. PATENT DOCUMENTS

| | | | |
|---|---|---|---|
| 2018/0227969 A1* | 8/2018 | Verkaik | ................. H04W 8/082 |
| 2018/0310387 A1* | 10/2018 | Turvy, Jr. | .......... H05B 47/1965 |
| 2018/0317090 A1* | 11/2018 | Zhang | ................ H04W 12/068 |
| 2022/0303868 A1* | 9/2022 | Kuenzi | .............. H04W 40/246 |
| 2023/0179668 A1* | 6/2023 | Lin | ........................... G06F 8/65 |
| | | | 717/172 |

* cited by examiner

*Primary Examiner* — Habte Mered

(74) *Attorney, Agent, or Firm* — Wang Law Firm, Inc.

(57) ABSTRACT

A network editing method for multiple wireless devices is disclosed, comprising a user presses and holds a touch button of the wireless device and the wireless device enters a public network and broadcasts new network information and the indicator lamp of the wireless devices flashes (blinks). If the wireless device receives a broadcast new network information from other wireless devices in the network, the MAC addresses of respectively two wireless devices are compared. If the MAC address is smaller, then broadcasting network information is stopped, other broadcasting the network information is continued. The method ensures that the interaction of data among a plurality of sub-networks is not interfered by each other, effectively reduces the number of devices in a single network, breaks away from the limitation that Bluetooth devices need mobile phones to configure the network, and enhances the stability and reliability of the network.

8 Claims, 5 Drawing Sheets obtaining devices to be networked, dividing devices to be networked into a plurality of groups of wireless devices ⌐ S101 obtaining a device network state corresponding to plurality of groups of wireless devices, connecting the plurality of groups of wireless devices respectively to a public network based on device network state ⌐ S102 obtaining device network information of wireless devices within public network, networking the plurality of groups of wireless devices separately based on device network information to generate a plurality of subnets ⌐ S103

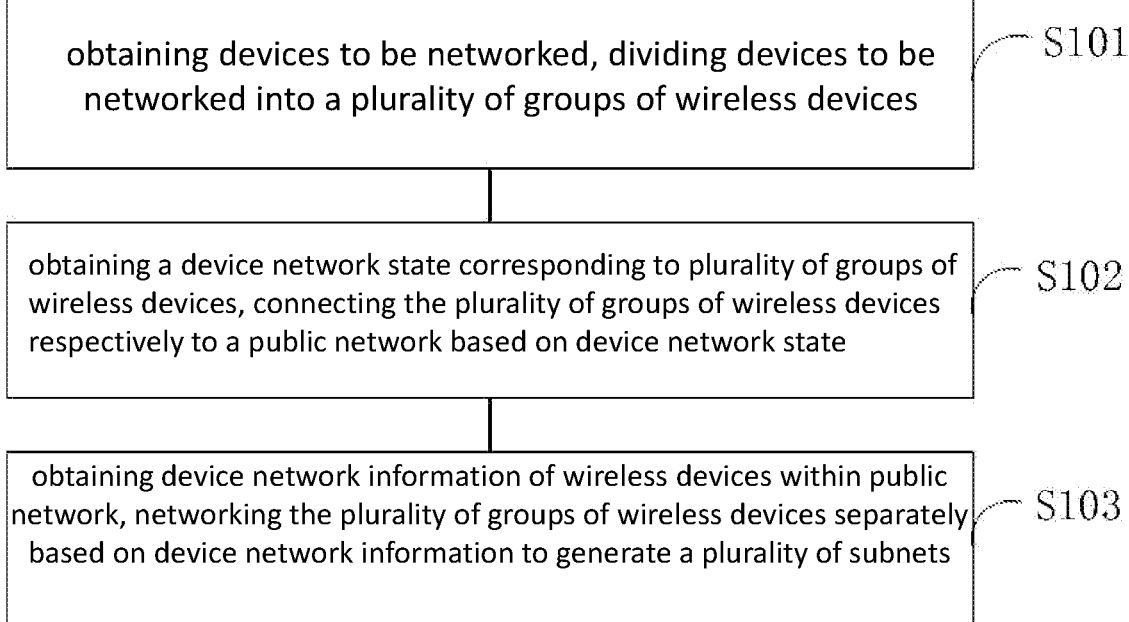

obtaining devices to be networked, dividing devices to be networked into a plurality of groups of wireless devices     ⌐ S101 obtaining a device network state corresponding to plurality of groups of wireless devices, connecting the plurality of groups of wireless devices respectively to a public network based on device network state     ⌐ S102 obtaining device network information of wireless devices within public network, networking the plurality of groups of wireless devices separately based on device network information to generate a plurality of subnets     ⌐ S103

Fig. 1

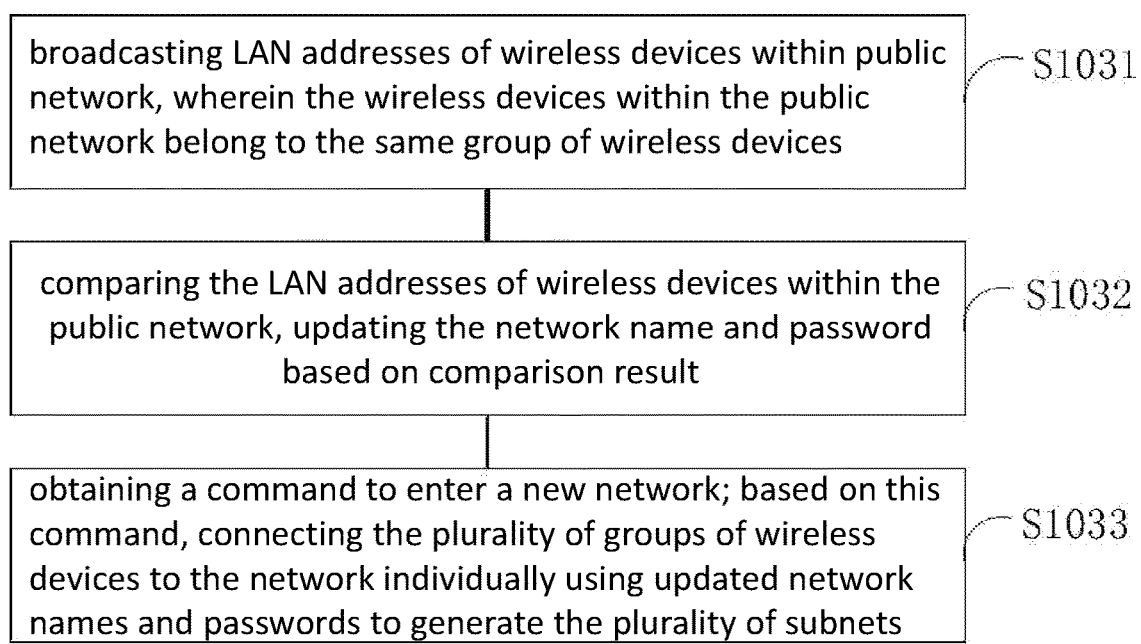

broadcasting LAN addresses of wireless devices within public network, wherein the wireless devices within the public network belong to the same group of wireless devices — S1031 comparing the LAN addresses of wireless devices within the public network, updating the network name and password based on comparison result — S1032 obtaining a command to enter a new network; based on this command, connecting the plurality of groups of wireless devices to the network individually using updated network names and passwords to generate the plurality of subnets — S1033

Fig. 3

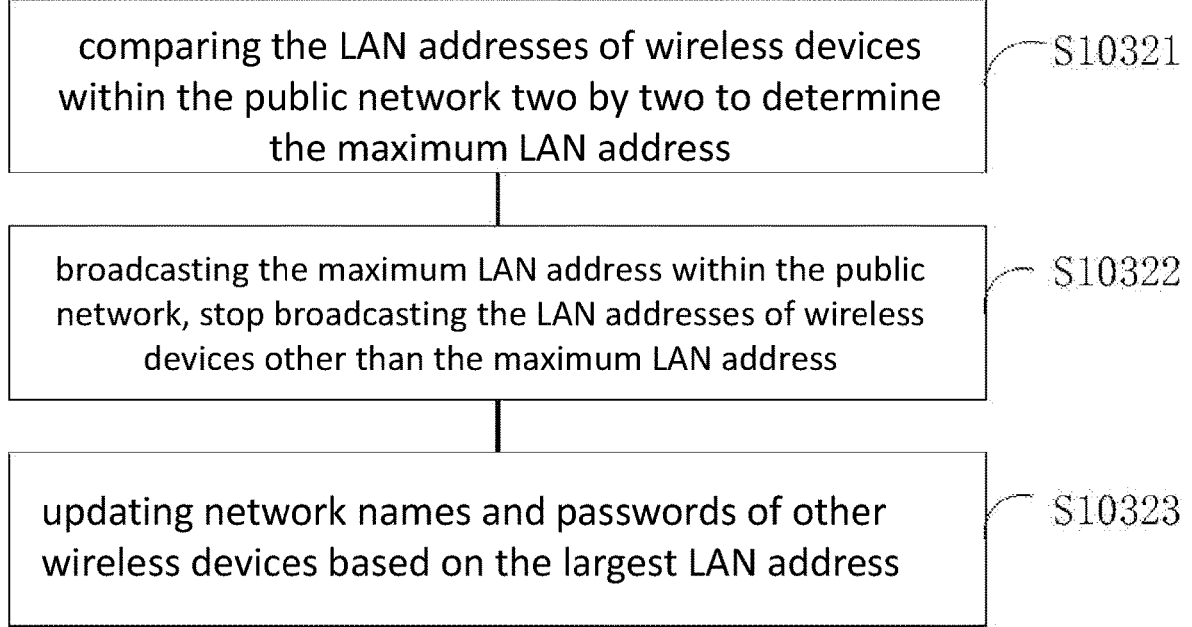

comparing the LAN addresses of wireless devices within the public network two by two to determine the maximum LAN address — S10321 broadcasting the maximum LAN address within the public network, stop broadcasting the LAN addresses of wireless devices other than the maximum LAN address — S10322 updating network names and passwords of other wireless devices based on the largest LAN address — S10323

Fig. 4

NETWORKING METHOD, DEVICE AND EQUIPMENT FOR LARGE-SCALE WIRELESS EQUIPMENT AND STORAGE MEDIUM

RELATED APPLICATION

This application claims priority to a Chinese Patent Application No. CN202211710028.5, filed on Dec. 29, 2022.

FIELD OF THE TECHNOLOGY

The present invention relates to the field of communication network technology, and in particular, to a method, an apparatus, a device, and a storage medium for networking large-scale wireless devices, in particular wireless devices on a large scale.

BACKGROUND

The Bluetooth technology is an open global standard for wireless data and voice communication, and is based on low-cost short-distance wireless connection, and ISM (Industrial Scientific Medical) radio wave bands of 2.4-2.485 GHz (Gigahertz) are used for implementing mutual communication, and daily electronic products such as Bluetooth headphones, mice, keyboards and the like are among the products of Internet of things (IOT) devices using Bluetooth technology.

When the number of devices in a Bluetooth network becomes large, the pressure on the network increases. In particular, data need to be transmitted between devices in the network, and when the frequency and the data volume of transmission become large, the reliability and stability of the network are affected.

BRIEF SUMMARY OF THE TECHNOLOGY

Therefore, the technical problem to be solved by the invention is to overcome the shortcomings of the prior art related to the decrease in reliability and stability of the network when the pressure on the network is increased when the total number of devices a Bluetooth network is relatively high.

According to a first aspect of the present invention there is provided a method of networking a plurality of wireless devices, comprising: acquiring wireless devices to be networked, and dividing the wireless devices to be networked into a plurality of groups of wireless devices, each group of wireless devices comprising at least two wireless devices; obtaining device network states corresponding to the plurality of groups of wireless devices, and respectively connecting the plurality of groups of wireless devices to a public network based on the device network states; and obtaining device network information of the wireless devices in the public network, and respectively networking the plurality of groups of wireless devices based on the device network information to generate a plurality of subnets.

According to the method of networking a plurality of wireless devices, the wireless devices to be networked are divided into the plurality of groups of wireless devices, and networking is conducted on the plurality of groups of wireless devices by utilizing the device network state and the device network information, a plurality of subnets are generated. The interaction of data among the plurality of subnets is not interfered by each other, which effectively reduces the number of devices in a single network. Moreover, the limitation that a Bluetooth device needs a mobile phone to configure the network is eliminated. Moreover, the stability and the reliability of the network can be enhanced.

Optionally, the device network information may comprise: local area network address, network name, and password local area network address, network name, and password.

Optionally, the step of obtaining device network information of the wireless devices in the public network, and respectively networking the plurality of groups of wireless devices based on the device network information to generate a plurality of subnets may further comprise: broadcasting a local area network (LAN) address of the wireless devices in the public network, wherein the wireless devices in the public network belong to the same group of wireless devices; comparing the local area network (LAN) addresses of the wireless devices in the public network and updating the network name and the password based on the comparison result; and obtaining a new network access command and respectively networking the plurality of groups of wireless devices by using the updated network names and passwords based on the new network access command to generate the plurality of subnets.

Optionally, the step of comparing the local area network (LAN) addresses of the wireless devices in the public network and updating the network name and the password based on the comparison result may further comprise: comparing the local area network (LAN) addresses of the wireless devices in the public network in pairs to determine a maximum local area network (LAN) address; broadcasting the maximum local area network (LAN) address in the public network, and stopping broadcasting local area network (LAN) addresses of other wireless devices except the maximum local area network (LAN) address; and updating network names and passwords of other wireless devices based on the maximum local area network (LAN) address.

Optionally, the step of generating the plurality of subnets by networking the plurality of groups of wireless devices using updated network names and passwords, respectively, based on the access new network command may further comprise: extracting a new network name and a new password in the access new network command, re-updating the updated network name and password based on the new network name and the new password, connecting the wireless device having the same network name and password to a new network, and generating the plurality of subnets.

Optionally, the method may further comprise: sending a load instruction to a load indicator lamp of a wireless devices of the public network, when the plurality of groups of wireless devices are connected to a public network, wherein the load indicator lamp of the wireless device in the public network enters a breathing state based on the load instruction.

Optionally, the method may further comprise: sending a closing or turn-off instruction to a load indicator lamp of the wireless device of the public network, when the wireless devices having the same network name and password are connected to the new network, wherein the load indicator lamp of the wireless device in the public network stops flashing based on the closing or turn-off instruction.

In a second aspect of the present application, there is also provided a networking device for networking a plurality of wireless devices, comprising: a dividing module configured for obtaining or acquiring wireless devices to be networked and dividing the wireless devices to be networked into a plurality of groups of wireless devices, each group of wireless devices comprising at least two wireless devices; an acquisition module configured for obtaining device network states corresponding to the plurality of groups of wireless devices and respectively connecting the plurality of groups of wireless devices to a public network based on the device network states; and a networking module configured for obtaining device network information of the wireless devices in the public network, and networking the plurality of groups of wireless devices respectively based on the device network information to generate a plurality of sub-nets.

In a third aspect of the present application, there is also provided a computer device configured for networking a plurality of wireless devices, comprising a processor and a memory, wherein said memory is configured for storing a computer program comprising instructions which, when the program is executed by the processor, cause the computer device to perform the method of the first aspect described above.

In a fourth aspect of the present application, embodiments of the present invention provide a computer-readable storage medium comprising instructions which, when executed by a processor, cause the processor to carry out the steps of the method of the first aspect described above.

BRIEF DESCRIPTION OF THE DRAWINGS

In order to more clearly illustrate the technical solutions in the specific embodiments or prior art of the present invention, the accompanying drawings to be used in the description of the specific embodiments or prior art will be briefly introduced below. It will be obvious to a person skilled in the art that the accompanying drawings and the following description are to illustrate special embodiments of the present invention in an exemplary manner, and that additional equivalent embodiments can be obtained based on the disclosure in the present application without being inventive.

FIG. 1 shows a schematic flowchart of a networking method for large-scale wireless devices according to an embodiment of the present invention;

FIG. 3 shows a flowchart of further optional details of step S103 according to an embodiment of the present invention;

FIG. 4 shows a flowchart of further optional details of step S1032 according to an embodiment of the present invention;

LIST OF REFERENCE NUMERALS

FIG. 2

Figure 5:
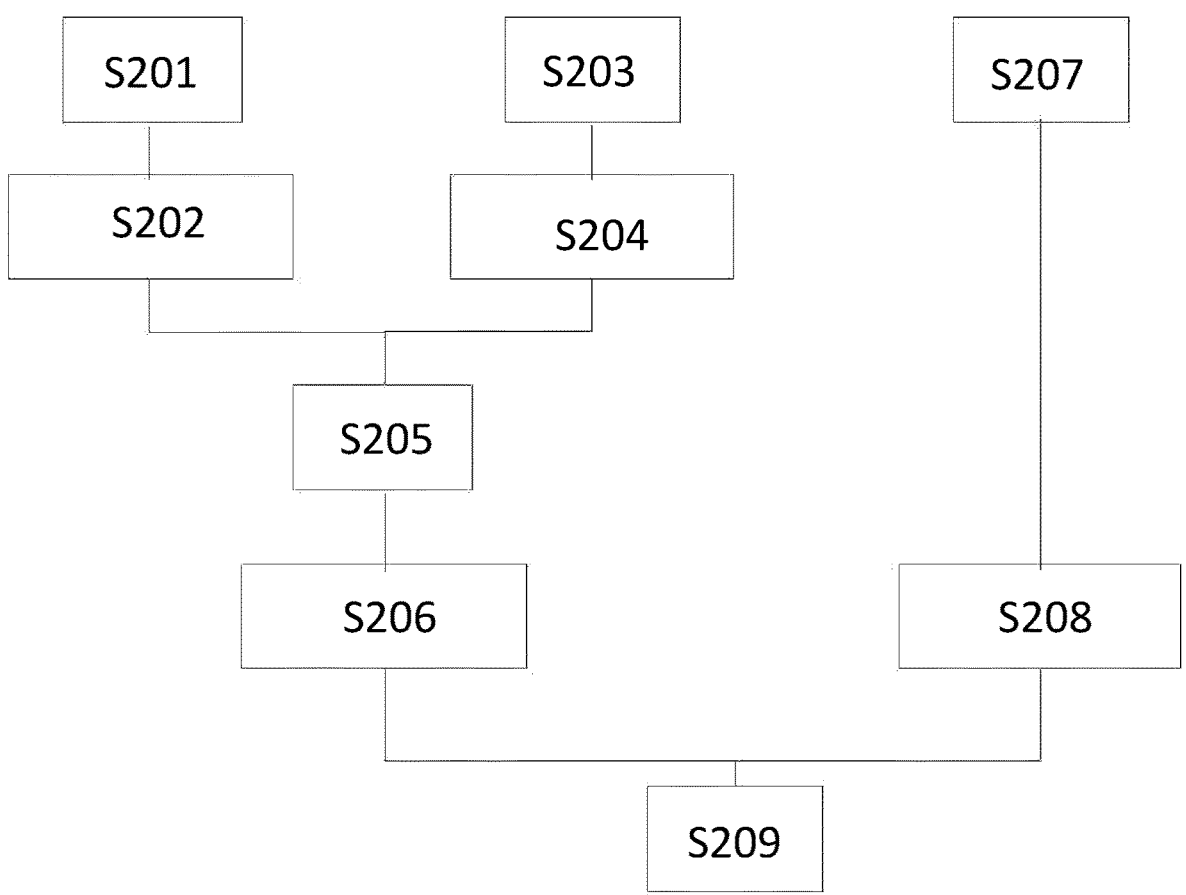
FIG. 5 shows a flowchart of comparing MAC addresses of wireless devices according to an embodiment of the present invention.

S201 Push touch button for editing network
S202 Press and hold touch button for 3 s to start editing the network, the indicator light flashes (1s every time)
S203 devices in the network detected ?
S204 devices not connected to the network
S205 setting up the network, accessing the public network
S206 broadcast MAC address, ON/OFF status; update network name IDs S207 MAC address received, start blinking load indicator lamp
S208 compare size of MAC addresses
S209 stop broadcasting MAC addresses, save received MAC addresses, save new network name IDs
S210 waiting for command to access a new network (new network access command)
S211 new network information received
S212 setting up access to new network
S213 stop blinking load indicator lamp
S220 device connected to the network, in the public network
S221 broadcast MAC address, ON/OFF status; update network name IDs
S222 MAC address received, start blinking load indicator lamp
S223 compare size of MAC addresses
S224 stop broadcasting MAC addresses, save received MAC addresses, save new network name IDs
S225 waiting for command to access a new network (new network access command)
S226 press and hold touch button again for 3 s, the load indicator lamp stops blinking
S227 broadcasting new network information (network ID and password)
S228 setting up access to new network
S229 stop blinking load indicator lamp
S230 device connected to the network, in a non-public network
S231 saving current network information
S232 there has been an intra-network broadcast; broadcast load indicator lamp start blinking command
S233 when a device in the network receives a load indicator lamp start blinking command
S234 access to the public network
S235 broadcasting available network information
S236 receive command
FIG. 5
S501 device A has no access to network, enters the configuration and broadcasts its MAC address
S502 receiving MAC address from device B; if A>B, then device B is considered as host and device B stops broadcasting its own MAC address; if A<B, then continue broadcasting MAC address
S503 device B has no access to network, enters the configuration and broadcasts its MAC address
S504 receiving MAC address from device A; if B>A, then device A is considered as host and device A stops broadcasting its own MAC; if B<A, then continue broadcasting MAC address
S505 only one of the devices is broadcasting its MAC address after the election, as device A
S506 receiving MAC address from device C; if A>C, then device C is considered as host and device C stops broadcasting its own MAC address; if A<C, then continue broadcasting MAC address
S507 device C has no access to network, enters the configuration and broadcasts its MAC address
S508 receiving MAC address from device A; if C>A, then device A is considered as host and device C stops broadcasting its own MAC address; if C<A, then continue broadcasting MAC address
S509 only one of the devices is broadcasting its MAC address after the election, as device A

DETAILED DESCRIPTION OF THE INVENTION

The technical embodiments of the present invention will be described clearly and completely in the following with reference to the accompanying drawings, and it is obvious that the described embodiments are a part of the embodiments of the present invention but not all of the embodiments. Based on the embodiments in the present invention, all other embodiments which are obtained by a person skilled in the art with routine efforts shall be covered by the scope of protection of the appended claims.

In the description hereinafter, it is to be noted that the terms 'center', 'up', 'down', 'left' 'right', 'vertical', 'horizontal', 'inside', 'outside', etc. indicate an orientation. The orientation or positional relationships indicated by 'left', 'right', 'vertical', 'horizontal', 'inside', 'outside', etc. are based on those shown in the accompanying drawings, and are intended only for the convenience of describing the present invention and for simplifying the description, and are not intended to indicate or imply that the device or element referred to must be constructed and operated with a particular orientation, and therefore are not to be construed as a limitation of the present invention. Furthermore, the terms 'first', 'second', 'third' are used for descriptive purposes only and are not to be understood as indicating or implying relative importance.

Furthermore, the technical features involved in the different embodiments of the present invention described below may be combined with each other as long as they do not constitute a conflict with each other.

The present embodiment provides a method of organizing network of large-scale wireless devices, as shown in FIG. 1, comprising the following steps:

S101: obtaining device to be networked or connected to the network, and dividing the devices to be networked into a plurality of groups of wireless devices, each group of wireless devices including at least one wireless device to be connected to the network.

More specifically, the to-be-networked devices are divided into a plurality of groups of wireless devices according to a preset number, each group of wireless devices is networked (connected to the network) according to the steps S102 and S103 outlined hereinafter, and each group of wireless devices corresponds to one subnet, thereby a plurality of subnets are generated.

S102: acquiring (obtaining) a device network states corresponding to the plurality of groups of wireless devices, and respectively connecting the plurality of groups of wireless devices to a public network based on the device network states.

More specifically, each wireless device is provided with a Bluetooth module, wherein each wireless device is an independent device, which is not yet connected to any network, when shipped from the factory to the customer.

Figure 2:
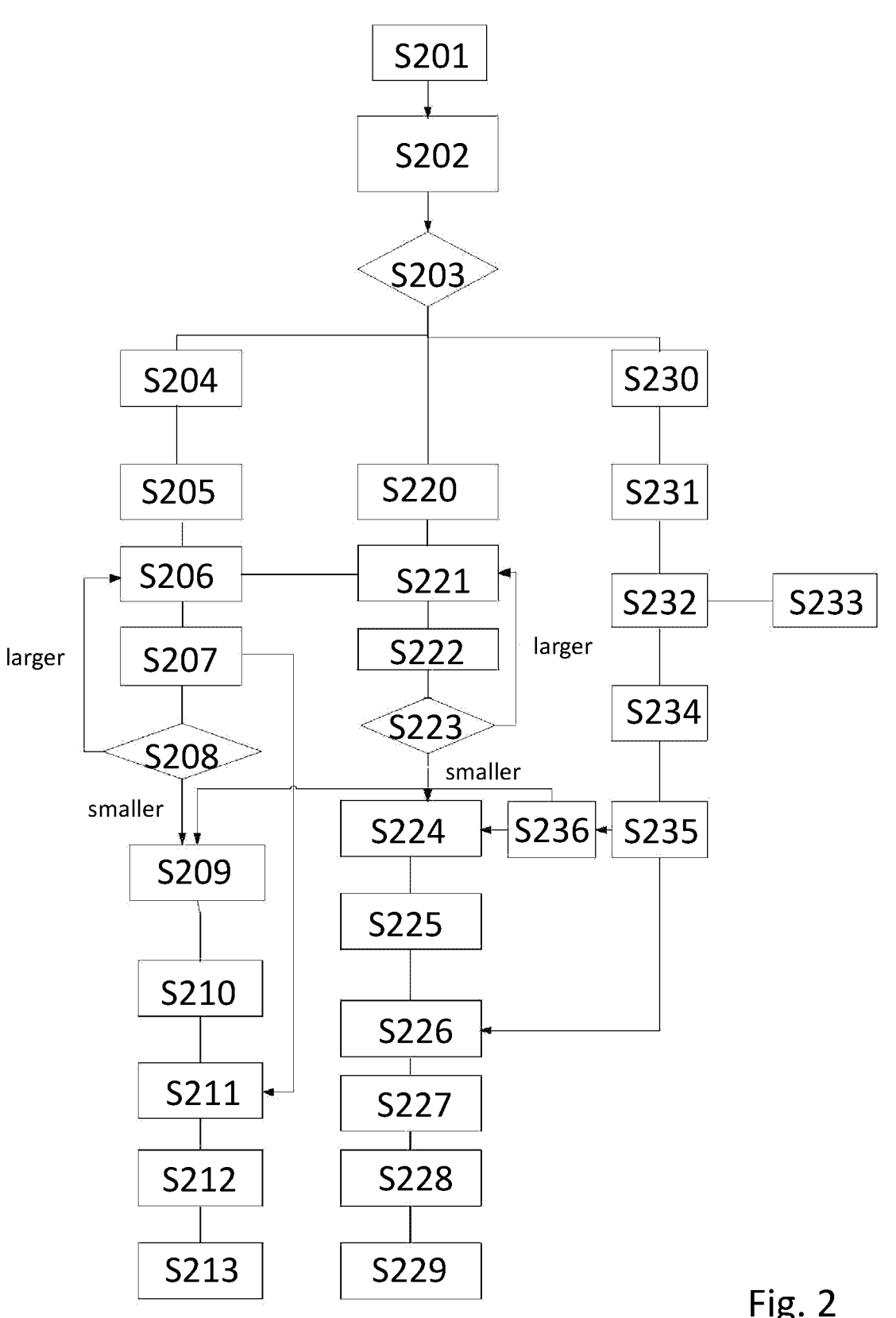
FIG. 2 shows a flowchart of networking of devices to be detected according to an embodiment of the present invention.

Further, as shown in FIG. 2, when the device network status of the wireless device is such that the wireless device is not connected to the network, the wireless device in the independent working mode presses the touch button for a relatively long time period of, e.g., 3 seconds, and then the wireless device enters (is connected to) the public network; when the device network state of the wireless device is such that it is connected to the network and is in the public network, no operation is performed; when the network state of the wireless device is such that the wireless device is in the network and is in the public network, the current network information is stored, a network access command is sent to the wireless device, the wireless device starts to flash after receiving the instruction, and the wireless device is added into (connected to or networked to) the public network.

Furthermore, when the plurality of groups of wireless devices are connected to a public network, a load instruction is sent to a load indicator lamp of a wireless device of the public network; the load indicator lamp of the wireless device in the public network then enters a breathing state based on the load instruction.

Further, when all devices N in a wireless device group enter the public network, the load indicator light will regularly go to a breathing state of e.g. 4 seconds on and e.g. 4 seconds off.

S103: acquiring or obtaining device network information of the wireless devices in the public network, and networking the plurality of groups of wireless devices based on the device network information to generate a plurality of subnets.

More specifically, the device network information includes at least the following: local area network address (i.e., MAC address), network name (i.e., network name ID), and password. Here, the MAC address (media access control address) is a unique identifier assigned to a network interface controller (NIC) for use as a network address in communications within a network segment.

Furthermore, when the wireless devices with the same network name and password are connected to the new network, a closing instruction is sent to a load indicator lamp of the wireless device of the public network; and the load indicator lamp of the wireless device in the public network stops flashing based on the closing instruction.

In the networking method according to the present invention, the devices to be networked are divided into a plurality of groups of wireless devices, networking is conducted on the plurality of groups of wireless devices by utilizing the device network state and the device network information, and a plurality of subnets are generated. The interaction of data between the plurality of subnets will not be interfered with by each other, thereby effectively reducing the number of devices in a single network. Moreover, the conventional limitation that Bluetooth devices require a cellular phone to configure a network is overcome and according to the present invention there is no need for such a cellular (smart) phone for configuration. This enhances also the network stability and reliability.

As an optional embodiment of the present invention, as shown in FIG. 3, step S103 of obtaining device network information of the wireless devices in the public network, and respectively networking or connecting the plurality of groups of wireless devices based on the device network information to a public network, to generate a plurality of subnets, may include in particular the following additional steps:

S1031: broadcasting local area network (LAN) addresses of the wireless devices in the public network; wherein the wireless devices in the public network belong to the same wireless device group.

More specifically, when a wireless device enters a public network, a local area network (LAN) address is broadcasted and a load indicator light provided on the wireless device begins to blink.

S1032: comparing the local network (LAN) addresses of the wireless devices in the public network, and updating the network name and the password based on the comparison result.

S1033: acquiring or obtaining a new network access command, and respectively networking the plurality of groups of wireless devices by using updated network names and passwords based on the new network access command to generate a plurality of subnets.

More specifically, a new network name and a new password in the new network access commend are extracted, the updated network name and password are updated again based on the new network name and the new password, and wireless devices with the same network name and password are connected to the new network to generate the plurality of subnets.

Furthermore, for any wireless device that enters the public network the touch button is long pressed for e.g. 3 seconds to generate a new network and the new network and password is broadcast to all wireless devices within the public network, and the wireless device receives it, then enters the new network, and the current device enters the new network, and the load indicator stops its breathing state, and the subnet is generated.

Furthermore, the network name ID and password are equivalent to a tag to distinguish the network, and devices with the same ID and password will form a new network by themselves, and both the network name ID and password are preferably 32 bit (bits) data.

As an alternative embodiment of the present invention, as shown in FIG. 4, step S1032, in which the local area network (LAN) addresses of the wireless devices in the public network are compared, and the network name and the password are updated based on the comparison result, may further comprise the following steps:

S10321: comparing the local area network (LAN) addresses (namely MAC addresses) of the wireless devices in the public network in pairs (two-by-two) to determine a maximum local area network address.

More specifically, as shown in FIG. 5, device A, device B and device C are connected to the public network and these devices broadcast their MAC addresses respectively. Device A receives the MAC address of device B, compares the MAC address of device A with the MAC address of device B, and if the MAC address of device A is smaller than the MAC address of device B, device A stops broadcasting its MAC address, and device B continues broadcasting the MAC address. Then the MAC address of device B is compared with the MAC address of device C and broadcasting by device B is stopped if the MAC address of device B is smaller than the MAC address of device C, and device C continues broadcasting the MAC address, wherein the MAC address corresponding to device C is the maximum local area network (LAN) address in the current public network.

S10322: broadcasting the maximum local area network (LAN) address in the public network, and stopping broadcasting local area network addresses of other wireless devices except the maximum local area network address.

More specifically, the MAC addresses of two wireless devices are compared simultaneously: if the network information is small, and broadcasting the network information is stopped, and network names and passwords broadcasted by other wireless devices are stored; if it is large, however, the MAC address continues to be sent.

S10323: updating network names and passwords of other wireless devices based on the maximum local area network (LAN) address.

More specifically, since the MAC address is unique to the wireless device, the MAC size is compared to finally allow only one wireless device in the public network to broadcast network information, thereby updating the network information of other wireless devices.

As shown in FIG. 2, a method of networking a plurality of wireless devices according to the present invention is described below with reference to a specific exemplary embodiment that shall not be construed to delimit the present invention as defined in the appended claims.

Example 1

When the network state of the current wireless device is such that it is not connected (accessed) to the network, the network is set or configured such that the current wireless device enters a public network.

The MAC address of the current wireless device is broadcast and the network name ID is updated;

The MAC addresses of other wireless devices are received (at this time, there are other wireless devices entering a public network), and a load indicator lamp starts flashing.

The MAC address of the current wireless device is compared with the MAC addresses of other wireless devices, and broadcasting the MAC address is continued if the MAC address of the current wireless device is larger than the MAC addresses of other wireless devices.

On the other hand, if the MAC address of the current wireless device is smaller than the MAC addresses of the other wireless devices, broadcasting the MAC address is stopped, the received MAC address is stored, and the network name ID of the current wireless device is updated.

Then, a command (an instruction) to enter a new network, i.e. a new network access command, is received, and based on the instruction, the load indicator lamp of the wireless device stops flashing.

Example 2

When the network state of the current wireless device is such that it has not accessed the network and is connected to the public network, the MAC address of the current wireless device is broadcast and the network name ID is updated.

The MAC addresses of other wireless devices are received (at this time, other wireless devices enter or access the public network), and a load indicator lamp of the wireless device starts flashing.

The MAC address of the current wireless device is compared with the MAC addresses of other wireless devices, and broadcasting the MAC address is continued if the MAC address of the current wireless device is larger than the MAC addresses of the other wireless devices.

On the other hand, if the MAC address of the current wireless device is smaller than the MAC addresses of the other wireless devices, broadcasting is stopped, the received MAC address is stored, and the network name ID of the current wireless device is updated.

The touch button of the wireless device is pressed and held for a relatively long time period of, e.g., 3 s (seconds) to create a new network and broadcast the new network and password to all wireless devices. When the current wireless device enters (accesses) the new network, the load indicator of the wireless device stops flashing.

Example 3

When the network state of the current wireless device is such that is has accessed the network and is in a non-public network, the current network information is stored, and a flashing instruction of a load indicator lamp is broadcast in the non-public network.

A flashing instruction is started turning on the load indicator lamp based on the load indicator lamp, and a network is edited so that the current wireless device enters a public network.

The MAC address of the current wireless device is broadcast in the public network.

The MAC addresses of other wireless devices are received, and the MAC address of the current wireless device is compared with the MAC addresses of other wireless devices, and broadcasting the MAC address is continued if the MAC address of the current wireless device is larger than the MAC address of the other wireless devices.

On the other hand, if the MAC address of the current wireless device is smaller than the MAC addresses of other wireless devices, broadcasting is stopped, the received MAC address is received and stored, and the network name ID of the current wireless device is updated.

The touch button of the wireless device is pressed and held for a relatively long time period of, e.g., 3 s (seconds), a new network is generated, and the new network and password is broadcast to all wireless devices.

The current wireless device enters the new network and the load indicator of the wireless device stops flashing.

Figure 6:
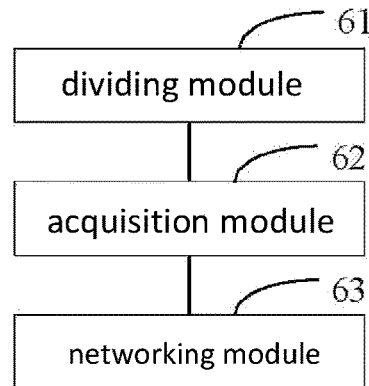
FIG. 6 shows a schematic block diagram of a networking device for large-scale wireless devices according to an embodiment of the present invention.

According to the present invention there is also provided a networking device for networking a plurality of wireless devices, as shown in FIG. 6, comprising at least the following:

A dividing module 61 configured to obtain (acquire) the devices to be networked, and divide the device to be networked into a plurality of groups of wireless devices.

More specifically, the devices to be networked are divided into a plurality of groups of wireless devices according to a preset number, wherein each group of wireless devices is respectively networked according to the following steps carried out by the acquisition module 62 and the networking module 63, and wherein each group of wireless devices corresponds to one subnet so that a plurality of subnets are generated.

The acquisition module 62 is configured to obtain device network states corresponding to the plurality of groups of wireless devices, and to respectively connect the plurality of groups of wireless devices to a public network based on the device network states. Particularly, the plurality of groups of wireless devices are connected to the public network individually based on the device network states.

More specifically, each wireless device is provided with a Bluetooth module, wherein each wireless device is an independent device when leaving the factory and shipped to the customer, which is not yet connected to any network.

Furthermore, as shown in FIG. 2, if the device network state of the wireless device is such that it is not connected to the network, the wireless device in the independent working mode presses the touch button for a relatively long time period of, e.g., 3 seconds, and the wireless device enters the public network. On the other hand, if the device network state of the wireless device is such that it is connected to the network access and is in the public network, no operation is performed. If the network state of the wireless device is such that the wireless device is in the network and is in the public network, the current network information is stored, a new network access command is sent to the wireless device, the load indicator lamp of the wireless device starts to flash after receiving the command, and the wireless device is added into the public network.

Further, when the plurality of groups of wireless devices are connected to a public network, a load instruction is sent to a load indicator lamp of a wireless device of the public network, and the load indicator lamp of the wireless device in the public network enters a breathing state based on the load instruction.

Further, when all N devices in a group of wireless devices enter the public network, the load indicator lamp will regularly go to a breathing state in which the load indicator lamp is repeatedly e.g. 4 seconds turned-on and 4 seconds turned-off.

The networking module 63 is configured to obtain device network information of the wireless devices in the public network, and to network the plurality of groups of wireless devices based on the device network information, so as to generate a plurality of subnets.

More specifically, the device network information may include at least the following: a local area network (LAN) address (i.e., the MAC address), a network name (i.e., network name ID), and a password.

Further, if wireless devices having the same network name and password are connected to the new network, a closing instruction is sent to a load indicator lamp of the wireless device of the public network and the load indicator lamp of the wireless device in the public network stops flashing based on the closing instruction.

By means of the networking device for networking a plurality of wireless devices according to the present invention, the devices to be networked are divided into a plurality of groups of wireless devices, networking is conducted for the plurality of groups of wireless devices using the device network state and the device network information, and a plurality of subnets are generated. Thus, it can be accomplished that the interaction of data among the plurality of subnets is not interfered by each other, and the number of device in a single network is effectively reduced. Moreover, the limitation or necessity according to the prior are that a Bluetooth device needs a mobile phone to configure the network can be eliminated, and the stability and the reliability of the network can be enhanced.

In an optional embodiment of the present invention, the networking module 63 may further comprise a broadcasting sub-module, a comparison sub-module and a subnet generating sub-module.

The broadcasting sub-module is configured to broadcast a local area network (LAN) addresses of the wireless devices in the public network, wherein the wireless devices in the public network belong to the same group of wireless devices. More specifically, when a wireless device enters a public network, a local area network address is broadcast, and a load indicator lamp provided on the wireless device begins to blink (flash).

The comparison sub-module is configured for comparing the local area network (LAN) addresses of the wireless devices in the public network and updating the network name and the password based on the comparison result.

The subnet generating sub-module is configured for obtaining (acquiring) a new network access command, and for respectively networking the plurality of groups of wireless devices based on the new network access command using the updated network names and passwords to generate a plurality of subnets. More specifically, a new network name and a new password in the new network access command are extracted, the updated network name and password are updated again based on the new network name and the new password, and wireless devices with the same network name and password are connected to the new network to generate the plurality of subnets.

Furthermore, for any wireless device entering the public network it is operated so that a touch button is pressed and held for a relatively long time period of, e.g., 3 s (seconds), and a new network access command is generated, the new network and passwords are broadcasted to all wireless devices in the public network, the wireless device enters the new network after receiving the passwords, the current device also enters the new network, and the load indicator lamp stops the breathing state to generate a subnet.

Furthermore, the network name ID and password are equivalent to a tag for the network to distinguish the network, and devices with the same ID and password will form a new network by themselves. Here, both the network name ID and the password may 32 bit (bits) data.

As an optional embodiment of the present invention, the afore-mentioned comparison sub-module may comprise a comparison unit for comparing the local area network (LAN) addresses of the wireless devices in the public network in pairs to determine the maximum local area network address.

More specifically, as shown in FIG. 5, it is assumed for this example that device A, device B and device C are connected to the public network and broadcast their MAC addresses respectively. Device A receives the MAC address of device B and the MAC address of device A is compared with the MAC address of device B. If the MAC address of device A is smaller than the MAC address of device B, device A stops broadcasting its MAC address, and device B continues broadcasting its MAC address. Then the MAC address of device B is compared with the MAC address of device C, and device B stops broadcasting its MAC address if the MAC address of device B is smaller than the MAC address of device C and device C continues broadcasting its MAC address. Then the corresponding MAC address of device C is the largest LAN address in the current public network.

The broadcasting unit is used to broadcast the maximum local area network (LAN) address in the public network and to stop broadcasting the local area network (LAN) addresses of other wireless devices except the maximum local area network (LAN) address.

More specifically, the MAC addresses of two wireless devices are compared simultaneously: if the network information is small, broadcasting the network information is stopped, and the network names and passwords broadcasted by the other wireless devices are stored. On the other hand, if the network information is large, the MAC address continues to be sent.

The updating unit is used to update the network names and passwords of other wireless devices based on the maximum local area network (LAN) address.

More specifically, since the MAC address is unique to the wireless device and is the only one that does not repeat, the purpose of comparing the MAC size is to eventually allow only one wireless device in the public network to broadcast network information, and then to update the network information of the other wireless devices.

Figure 7:
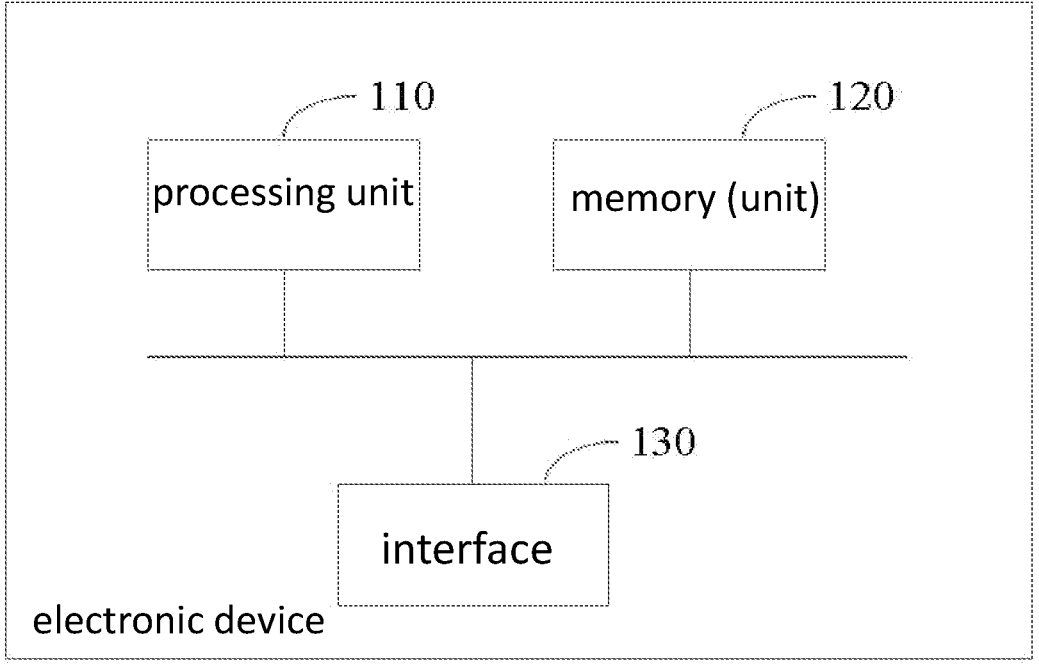
FIG. 7 shows a specific block diagram of an electronic device according to an embodiment of the present invention.

In addition, an electronic device is provided in an embodiment of the present invention, as shown in FIG. 7, where the electronic device may include a processor 110 and a memory 120, wherein the processor 110 and the memory 120 may be connected by a bus or other manner, wherein the connection is exemplified in FIG. 7 by a bus. In addition, the electronic device may further include at least one interface 130, wherein the at least one interface 130 may be, e.g., a communication interface or other interfaces, and the embodiment is not limited thereto.

The processor 110 may be a central processing unit (CPU). The processor 110 may also be embodied in a different manner, e.g., as a general purpose processor, digital signal processor (DSPs), application specific integrated circuit (ASIC), field programmable gate array (FPGA) or as a programmable logic device, a discrete gate or transistor logic device, discrete hardware components, or a combination of the above.

The memory 120, as a non-transitory computer readable storage medium, may be used for storing non-transitory software programs, non-transitory computer executable programs, and modules, such as program instructions/modules corresponding to the video compositing method according to embodiments of the present invention. The processor 110 executes various functional applications of the processor and data processing, i.e., implements a method of networking a plurality of wireless devices in the above-described method embodiments, by running non-transitory software programs, instructions, and modules stored in the memory 120.

Memory 120 may include a storage program area that may store an operating system, at least one application program required for functionality, and a storage data area, wherein the storage data area may store data created by the processor 110, etc. In addition, memory 120 may include high-speed random access memory, and may also include non-transitory memory, such as at least one magnetic disk storage device, flash memory device, or other non-transitory solid state storage device. In some embodiments, memory 120 may optionally include memory located remotely from processor 110, which may be connected to processor 110 via a network. Examples of such networks include, but are not limited to, the Internet, Intranets, local area networks (LAN), mobile communication networks, and combinations thereof.

In addition, at least one interface 130 is used for communication of the electronic device with external devices, such as with a server or the like. Optionally, at least one interface 130 may also be used to connect peripheral input/output (I/O) devices, such as a keyboard, display screen, etc.

The one or more software modules may be stored in the memory 120 and when executed by the processor 110 cause the processor 110 to perform a method of networking a plurality of wireless devices as outlined in the present specification for the embodiments of FIGS. 1 to 5.

The specific details of the electronic device may be understood correspondingly with respect to the corresponding related descriptions and effects in the embodiment shown in FIG. 1, which are not repeated herein.

As will become apparent from the above disclosure, the networking method according to the present invention can be summarized as follows:

When the number of wireless devices within a Bluetooth network (public network) communicating via Bluetooth becomes large, this will increase the pressure on the network. Especially the wireless devices within the network also need to transmit data to each other. When the frequency of transmission and the amount of data becomes large, then this will affect the reliability and stability of the network. Therefore, according to the present invention an editing method for generating multiple subnets is used to divide and assign the wireless devices into multiple subnets, which ensures the realization of the function as well as the stability of the network.

The network editing method for multiple wireless devices comprises in particular the following steps:

1. There is a Bluetooth module on each wireless device for transmission of data and data exchange with other wireless devices in a Bluetooth network. Each wireless device is an independent device when it is shipped from the factory to the end customer, and when it is shipped and delivered to customer it is not yet connected to any network.

2. For initiating connection to a public network, a user presses and holds a touch button of the wireless device in an independent working mode for a relatively long predetermined time period of, e.g., 3 s. If the touch button is pushed, then the wireless device enters or accesses the public network and broadcasts new network information and the indicator lamp of the wireless devices flashes (blinks). If the wireless device receives a broadcast new network information from other wireless devices in the network during this process, the MAC addresses of respectively two wireless devices are compared with each other at the same time (i.e. the comparison is performed pairwise (two-by-two)): if the MAC address is smaller, then broadcasting network information is stopped and broadcasting the network information by the other wireless device is stopped; otherwise, if the MAC address is larger, then broadcasting (sending) the network information is continued.

3. The operation in step 2 is continued to let all N devices enter the public network. At this time, the load indicator lamp will regularly undergo a breathing state, where the load indicator lamp turns on and off at regular time intervals of, e.g., 4 s turned-on and 4 s turned-off.

4. Any other wireless device that is to enter the public network is operated in the same manner. In particular, a user presses and holds a touch button of the wireless device in an independent working mode for a relatively long predetermined time period of, e.g., 3 s to generate a new network and broadcast the new network information and password to all other wireless devices. When the wireless device receives the new network information and password, it enters the new network, and the current device also enters the new network. The load indicator lamp then stops breathing state. Thus, a new network is generated.

5. Steps 1 to 4 are repeated to continue generating multiple networks.

The interaction of data between multiple networks will not be interfered with by each other, effectively reducing the number of devices within a single network and enhancing the stability and reliability of the network. It also removes the limitation of the prior art that Bluetooth devices require a smart phone for network configuration.

As will become apparent to the person skilled in the art, the term 'local area network (LAN) address' as used herein relates in particular to a WLAN-address.

It will be appreciated by those skilled in the art that all or part of the above-described exemplary methods of the present invention may be implemented by means of a computer program to instruct related hardware, wherein the computer program may be stored in a computer readable storage medium, and the computer program may include the above-described embodiment method when executed. The storage medium may be a magnetic Disk, an optical disc, a Read-Only Memory (ROM), a random access Memory (Random Access Memory, RAM), a Flash Memory (Flash Memory), a Hard Disk (HDD), a Solid State Drive (SSD), or the like; the storage medium may also comprise a combination of memories of the kind described above.

Although embodiments of the present invention have been described in connection with the accompanying drawings, various modifications and variations may be implemented by those skilled in the art without departing from the general spirit and scope of the invention, and such modifications and variations shall fall the scope of the present invention as defined in the appended claims.

What is claimed is:

1. A method of networking a plurality of wireless devices, comprising:

acquiring wireless devices to be networked, and dividing the wireless devices to be networked into a plurality of groups of wireless devices, each group of wireless devices comprising at least two wireless devices;

obtaining device network states corresponding to the plurality of groups of wireless devices, and respectively connecting the plurality of groups of wireless devices to a public network based on the device network states; and obtaining device network information of the wireless devices in the public network, and respectively networking the plurality of groups of wireless devices based on the device network information to generate a plurality of subnets;

wherein the device network information comprises: local area network address, network name, and password.

2. The method of networking a plurality of wireless devices as claimed in claim 1, wherein the step of obtaining device network information of the wireless devices in the public network, and respectively networking the plurality of groups of wireless devices based on the device network information to generate a plurality of subnets comprises:

broadcasting a local area network (LAN) address of the wireless devices in the public network, wherein the wireless devices in the public network belong to the same group of wireless devices;

comparing the local area network (LAN) addresses of the wireless devices in the public network and updating the network name and the password based on the comparison result; and obtaining a new network access command and respectively networking the plurality of groups of wireless devices by using the updated network names and passwords based on the new network access command to generate the plurality of subnets.

3. The method of networking a plurality of wireless devices as claimed in claim 2, wherein the step of comparing the local area network (LAN) addresses of the wireless devices in the public network and updating the network name and the password based on the comparison result comprises:

comparing the local area network (LAN) addresses of the wireless devices in the public network in pairs to determine a maximum local area network (LAN) address;

broadcasting the maximum local area network (LAN) address in the public network, and stopping broadcasting local area network (LAN) addresses of other wireless devices except the maximum local area network (LAN) address; and updating network names and passwords of other wireless devices based on the maximum local area network (LAN) address.

4. The method of networking a plurality of wireless devices as claimed in claim 3, wherein the step of generating the plurality of subnets by networking the plurality of groups of wireless devices using updated network names and passwords, respectively, based on the access new network command comprises:

extracting a new network name and a new password in the access new network command, re-updating the updated network name and password based on the new network name and the new password, connecting the wireless device having the same network name and password to a new network, and generating the plurality of subnets.

5. The method of networking a plurality of wireless devices as claimed in claim 4, further comprising:

sending a load instruction to a load indicator lamp of a wireless devices of the public network, when the plurality of groups of wireless devices are connected to a public network, wherein the load indicator lamp of the wireless device in the public network enters a breathing state based on the load instruction.

6. The method of networking a plurality of wireless devices as claimed in claim 5, further comprising:

sending a closing or turn-off instruction to a load indicator lamp of the wireless device of the public network, when the wireless devices having the same network name and password are connected to the new network, wherein the load indicator lamp of the wireless device in the public network stops flashing based on the closing or turn-off instruction.

7. A computer device configured for networking a plurality of wireless devices, comprising a processor and a memory, wherein said memory is configured for storing a computer program comprising instructions which, when the program is executed by the processor, cause the computer device to carry out the steps of the method as claimed in claim 1.

8. A non-transitory computer-readable storage medium comprising instructions which, when executed by a processor, cause the processor to carry out the steps of the method as claimed in claim 1.

\* \* \* \* \*